INVENTOR
RALPH W. MOORE
BY Connolly & Hutz
HIS ATTORNEYS

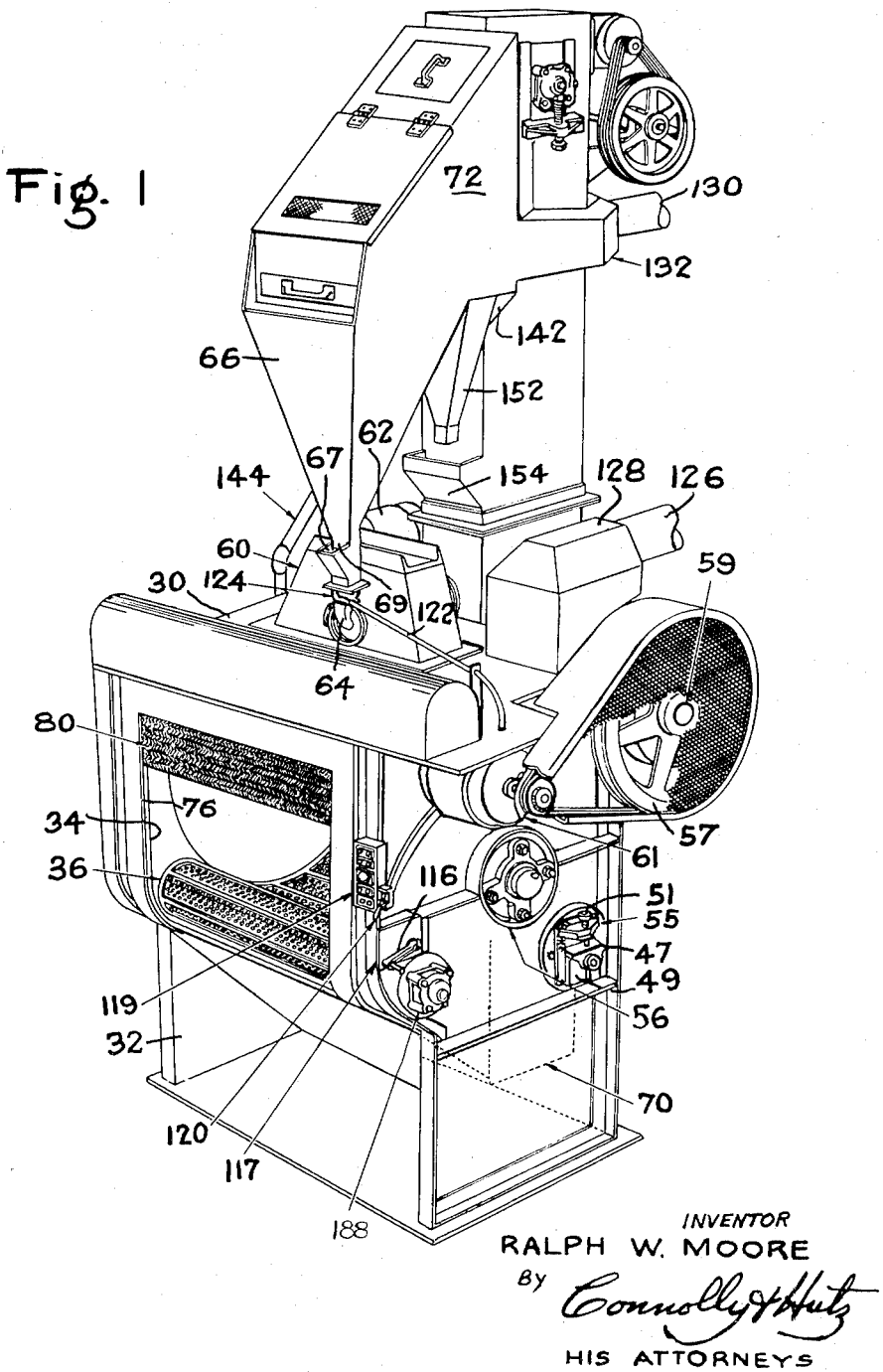

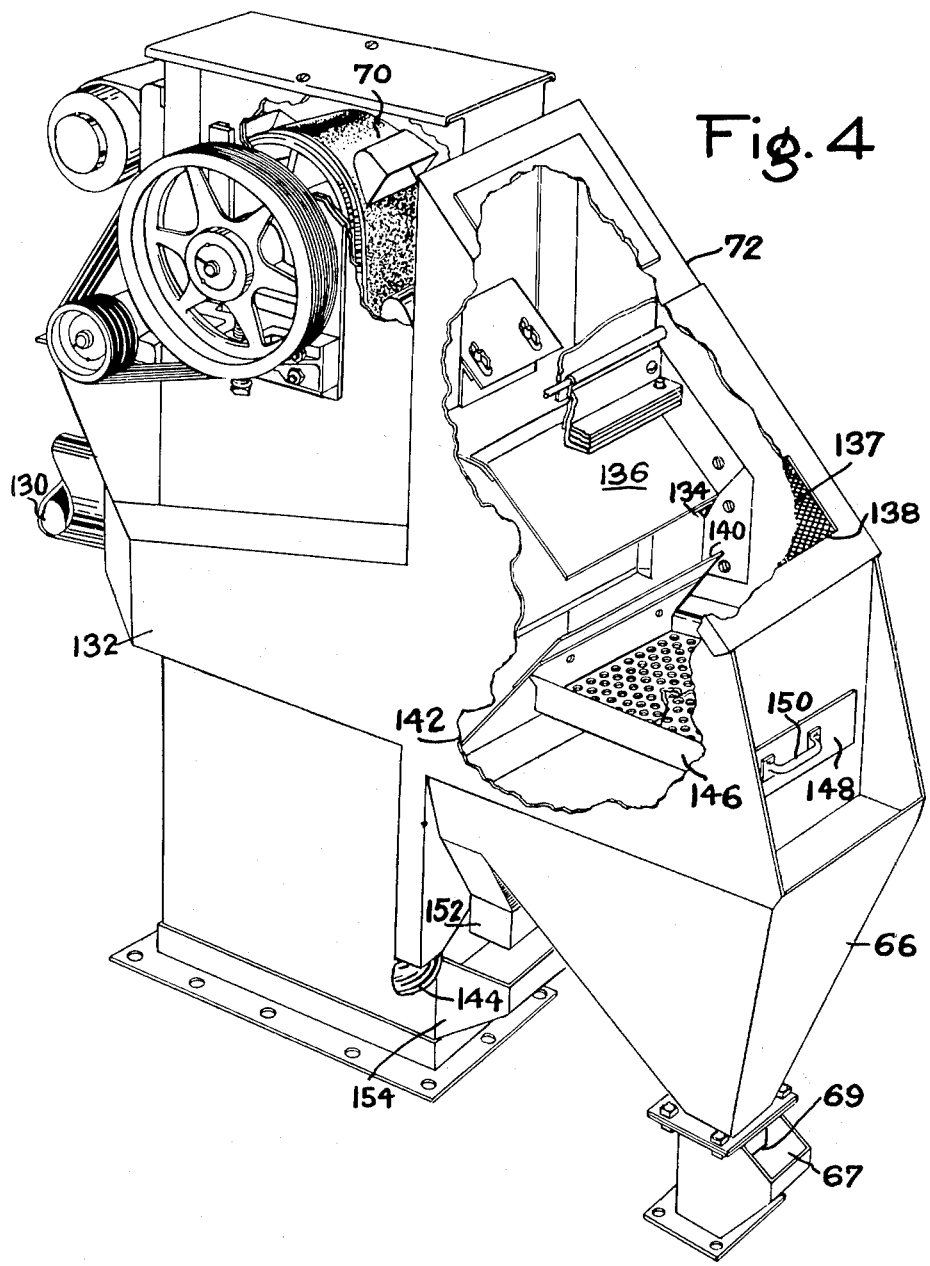

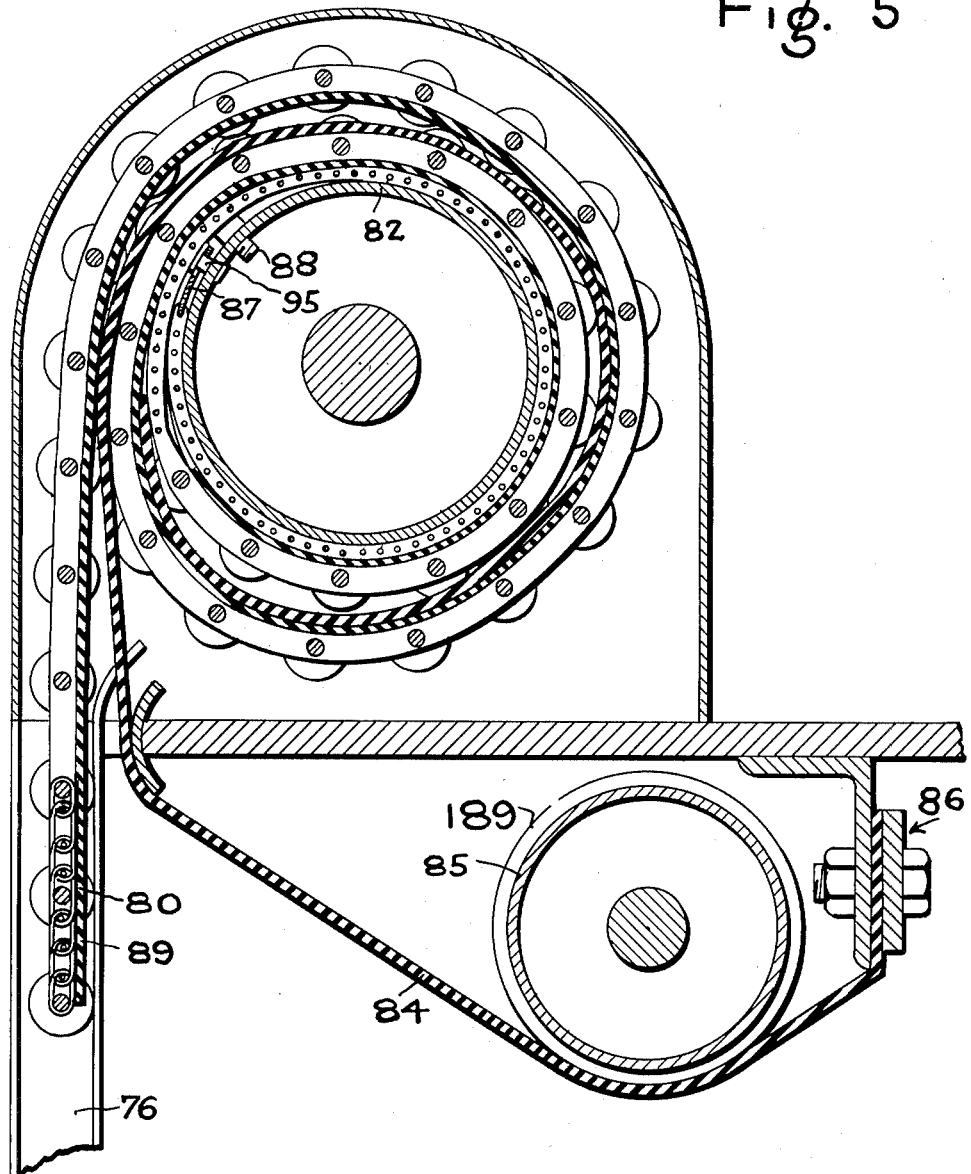

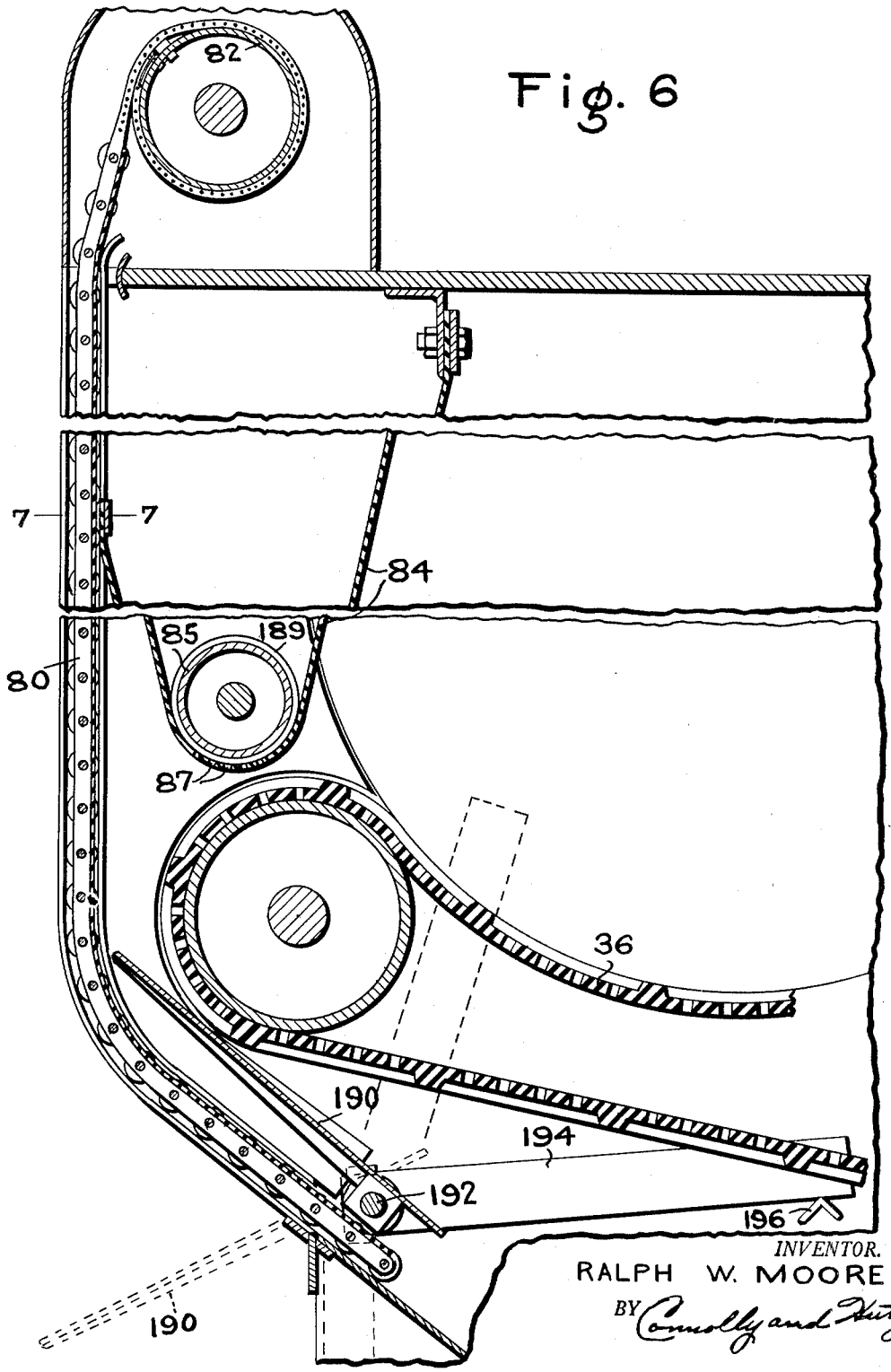

Aug. 30, 1955  R. W. MOORE  2,716,310
BLASTING APPARATUS
Filed Nov. 28, 1952  16 Sheets-Sheet 6
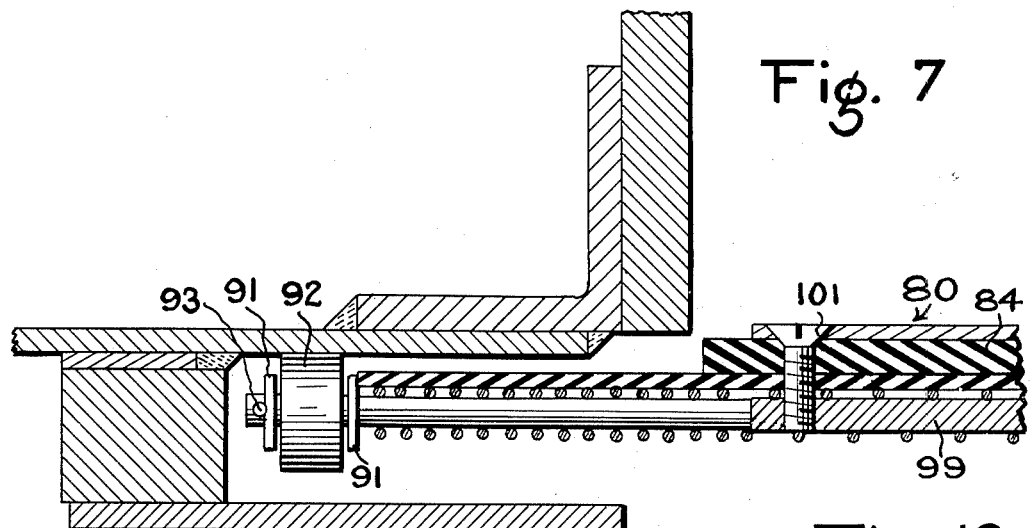
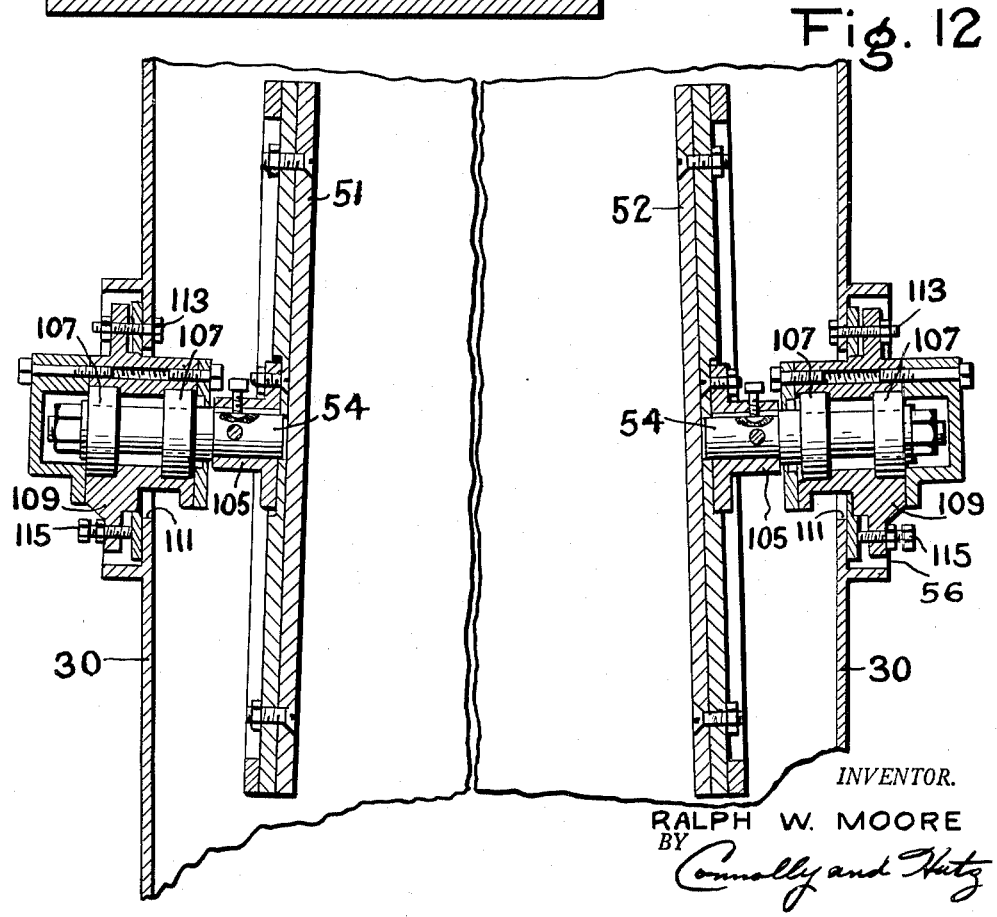
INVENTOR.
RALPH W. MOORE
BY Connolly and Hutz
HIS ATTORNEYS Aug. 30, 1955  R. W. MOORE  2,716,310
BLASTING APPARATUS
Filed Nov. 28, 1952  16 Sheets-Sheet 7
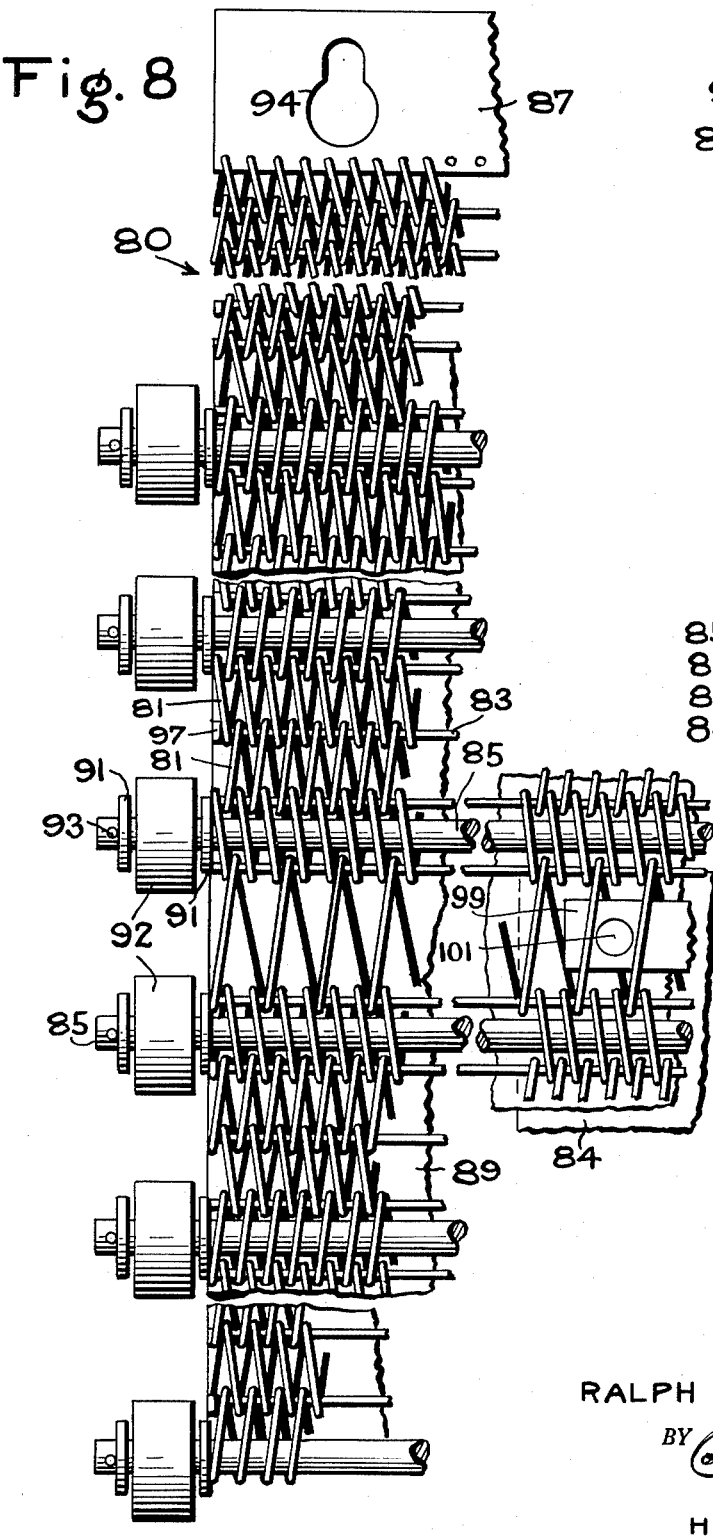
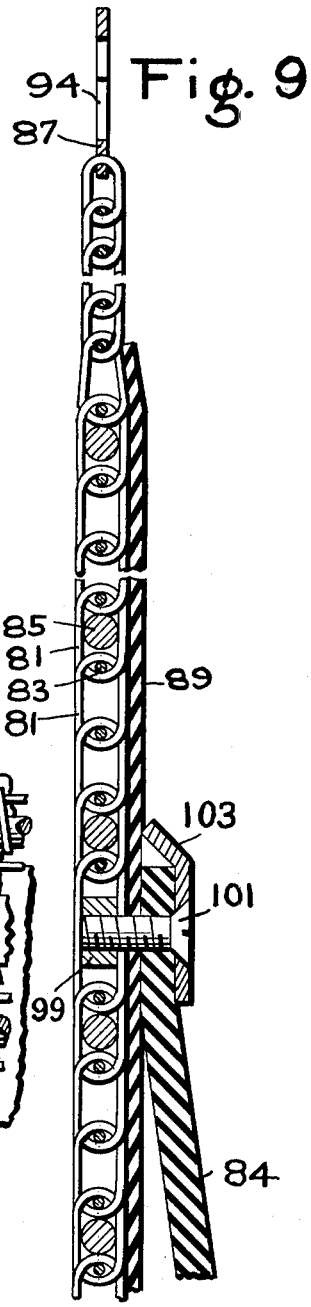
INVENTOR.
RALPH W. MOORE
BY Connolly and Hutz
HIS ATTORNEYS

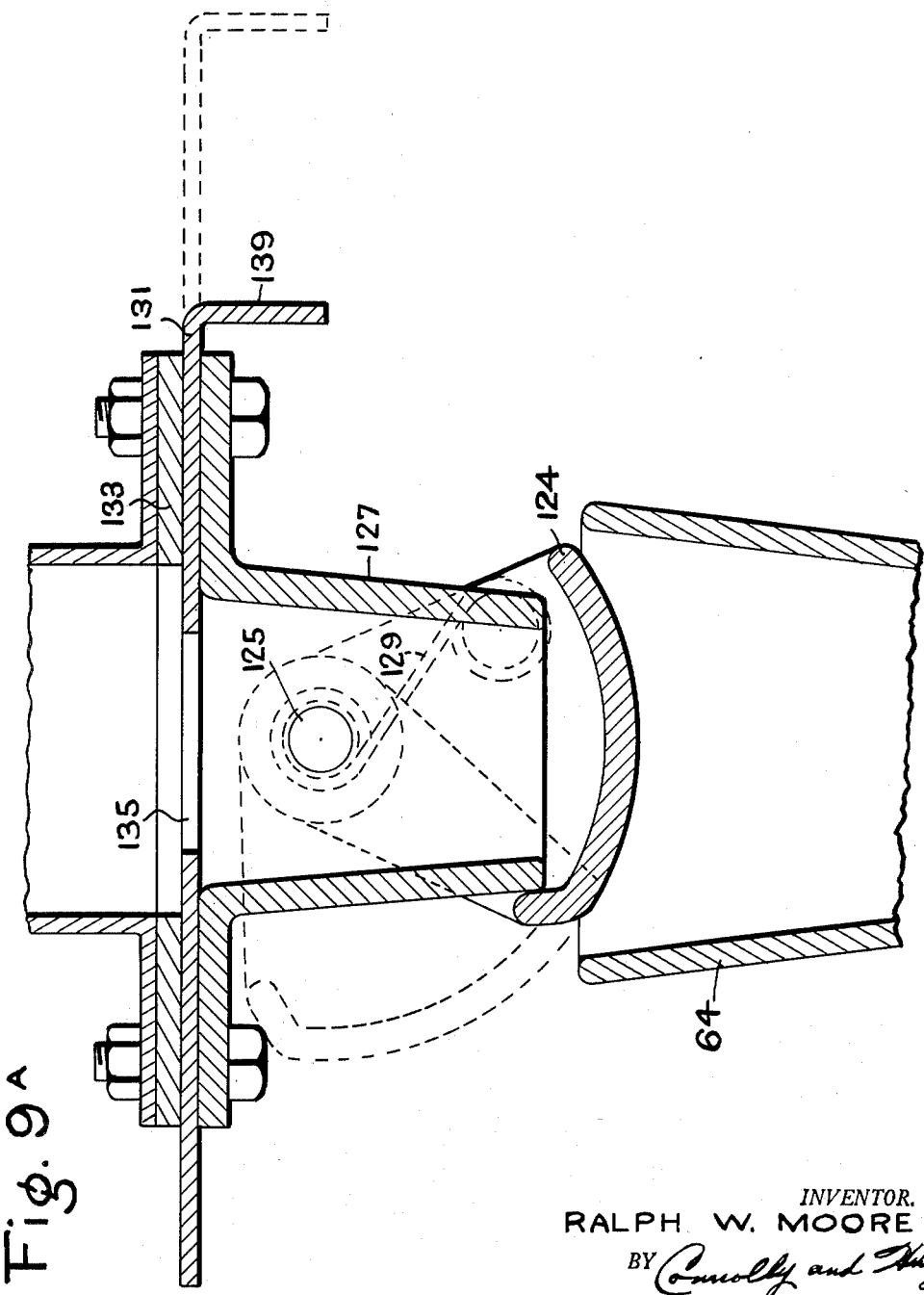

Aug. 30, 1955  R. W. MOORE  2,716,310
BLASTING APPARATUS
Filed Nov. 28, 1952  16 Sheets-Sheet 9
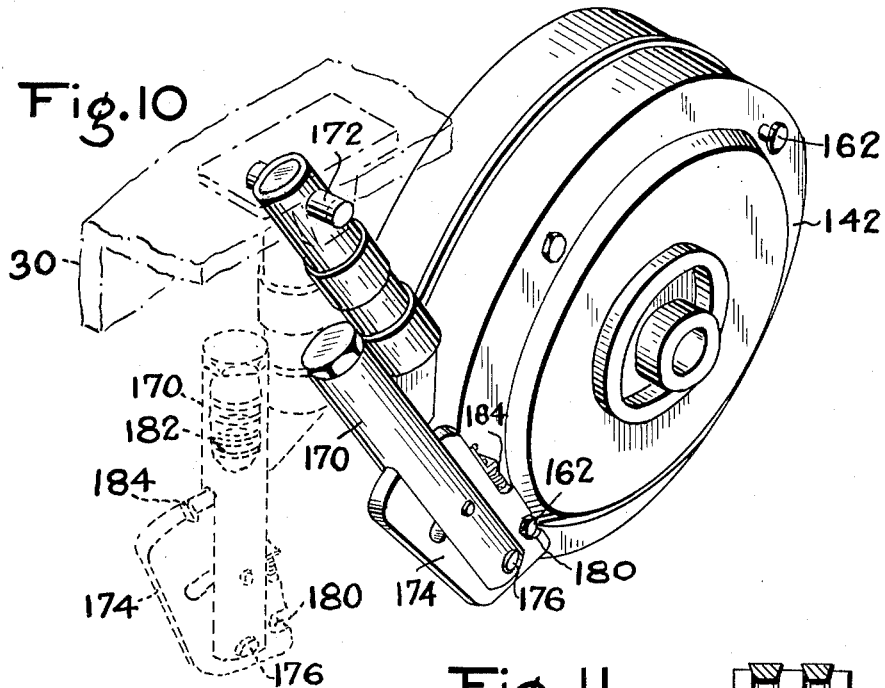
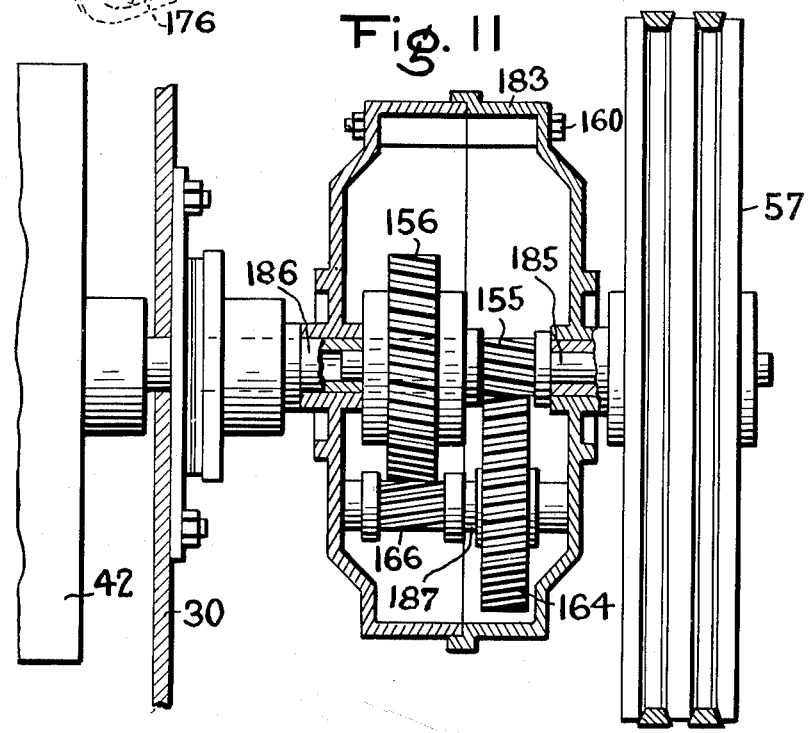
INVENTOR.
RALPH W. MOORE
BY Connolly and Hutz
HIS ATTORNEYS

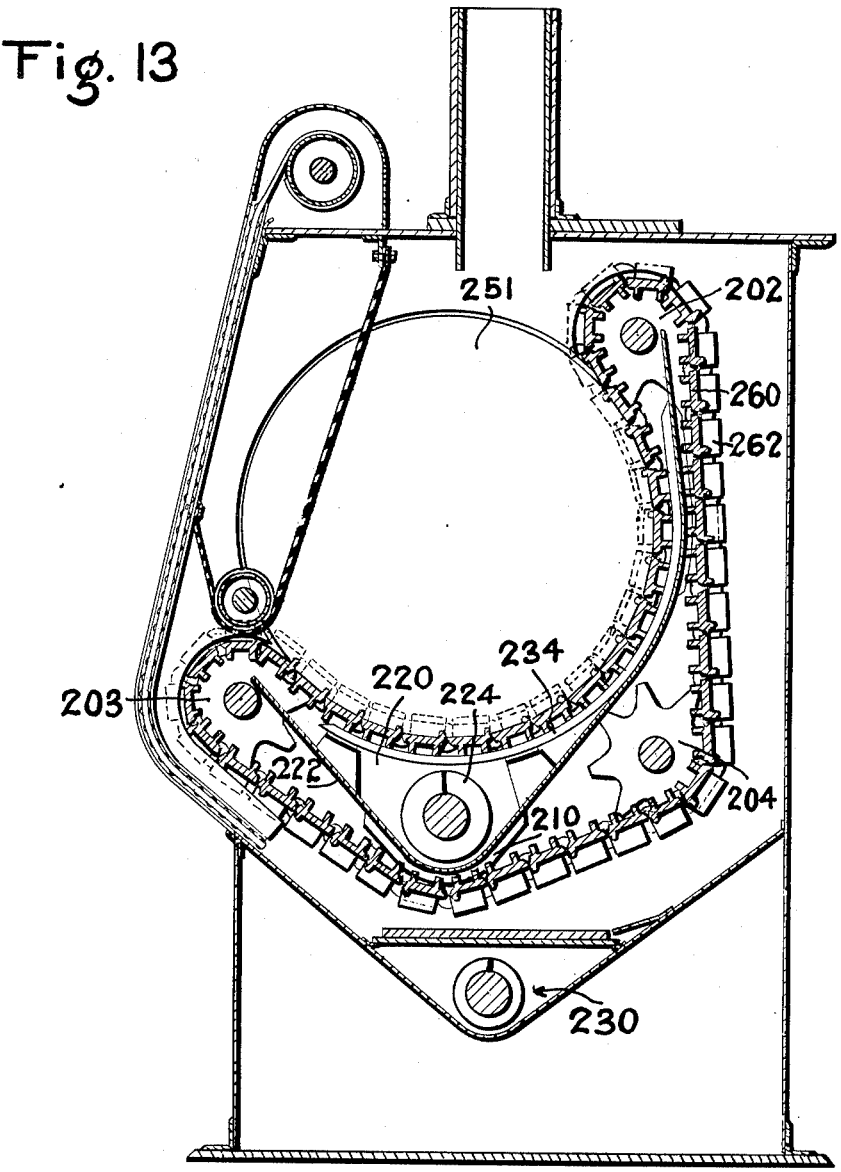

Aug. 30, 1955 R. W. MOORE 2,716,310
BLASTING APPARATUS
Filed Nov. 28, 1952 16 Sheets-Sheet 11

INVENTOR.
RALPH W. MOORE
BY Connolly and Hutz

HIS ATTORNEYS

Aug. 30, 1955  R. W. MOORE  2,716,310
BLASTING APPARATUS
Filed Nov. 28, 1952  16 Sheets-Sheet 12

INVENTOR.
RALPH W. MOORE
BY Connolly and Hutz
HIS ATTORNEYS

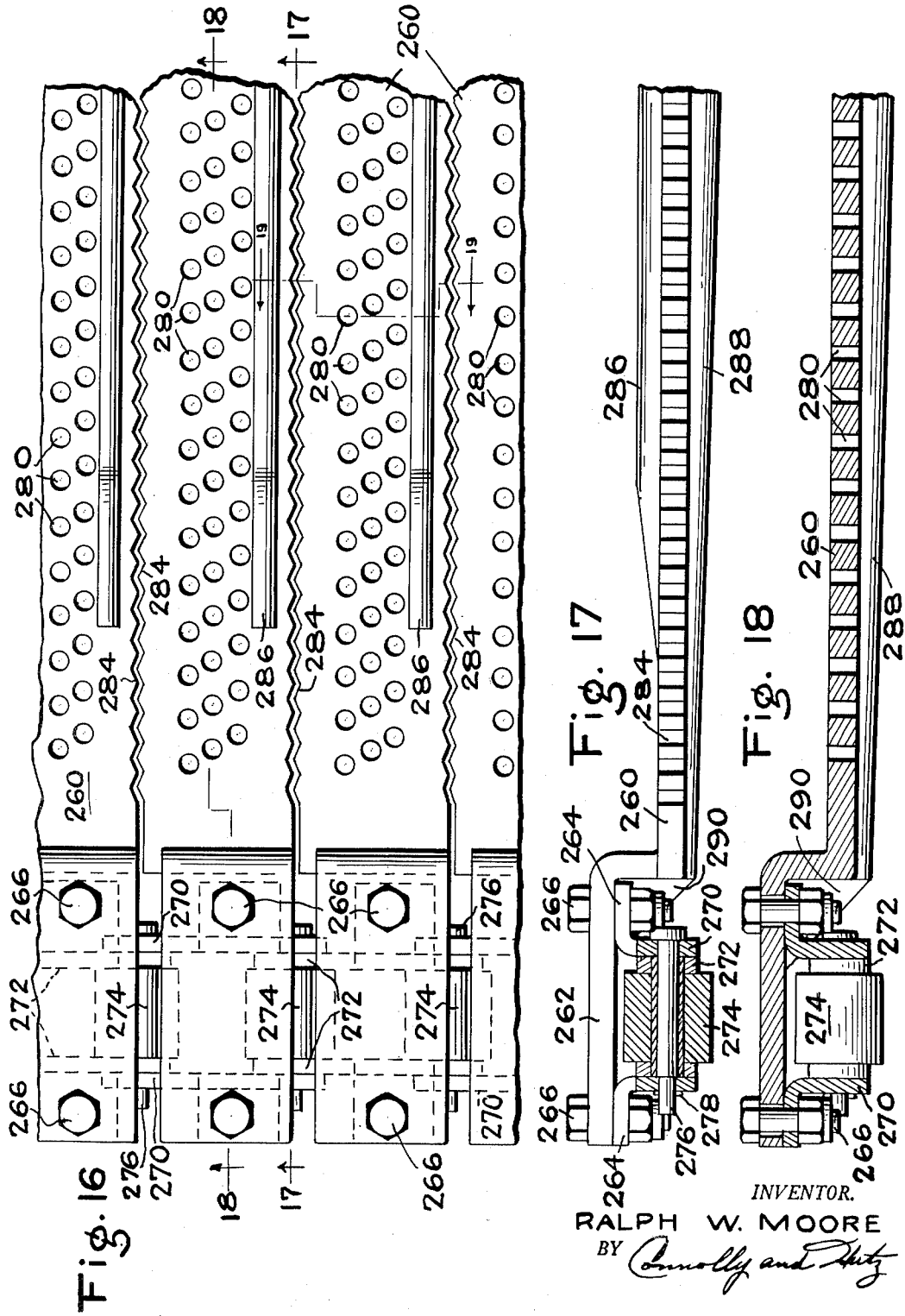

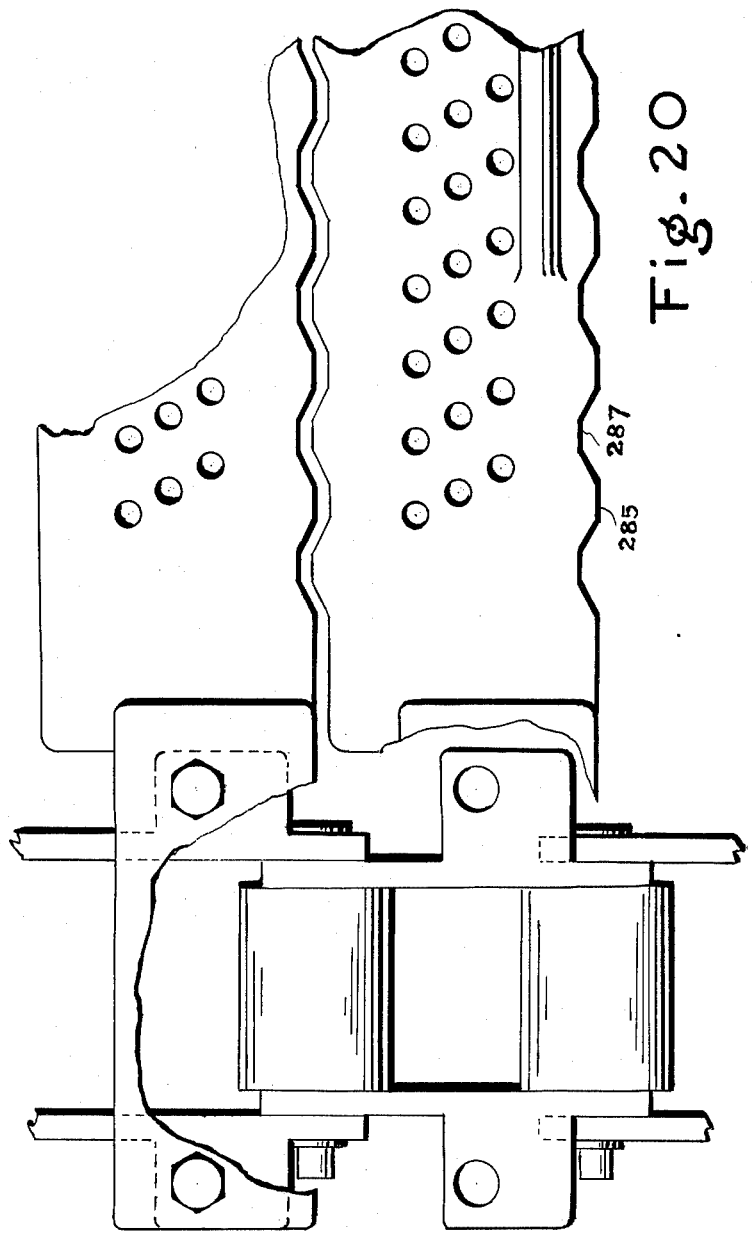

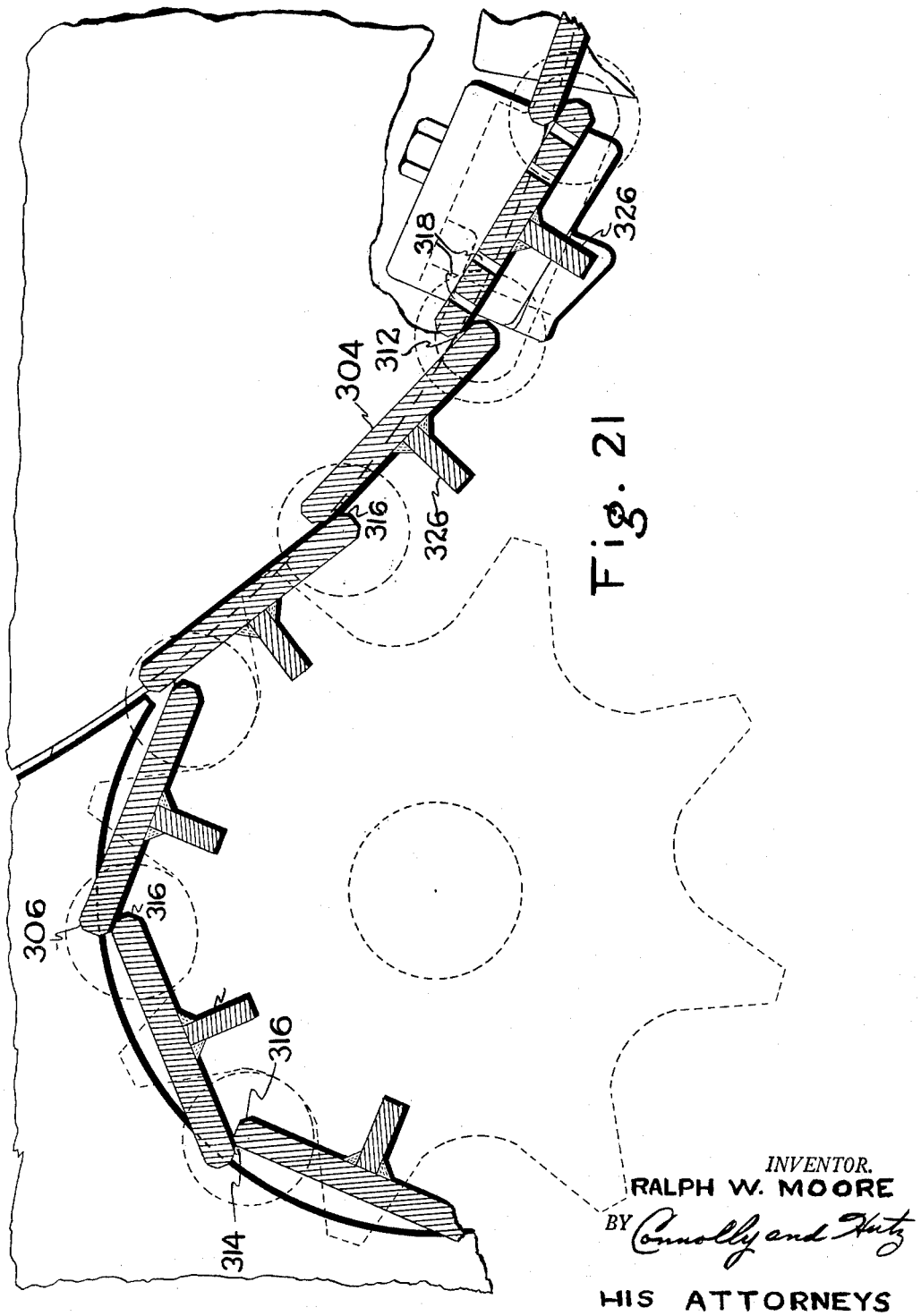

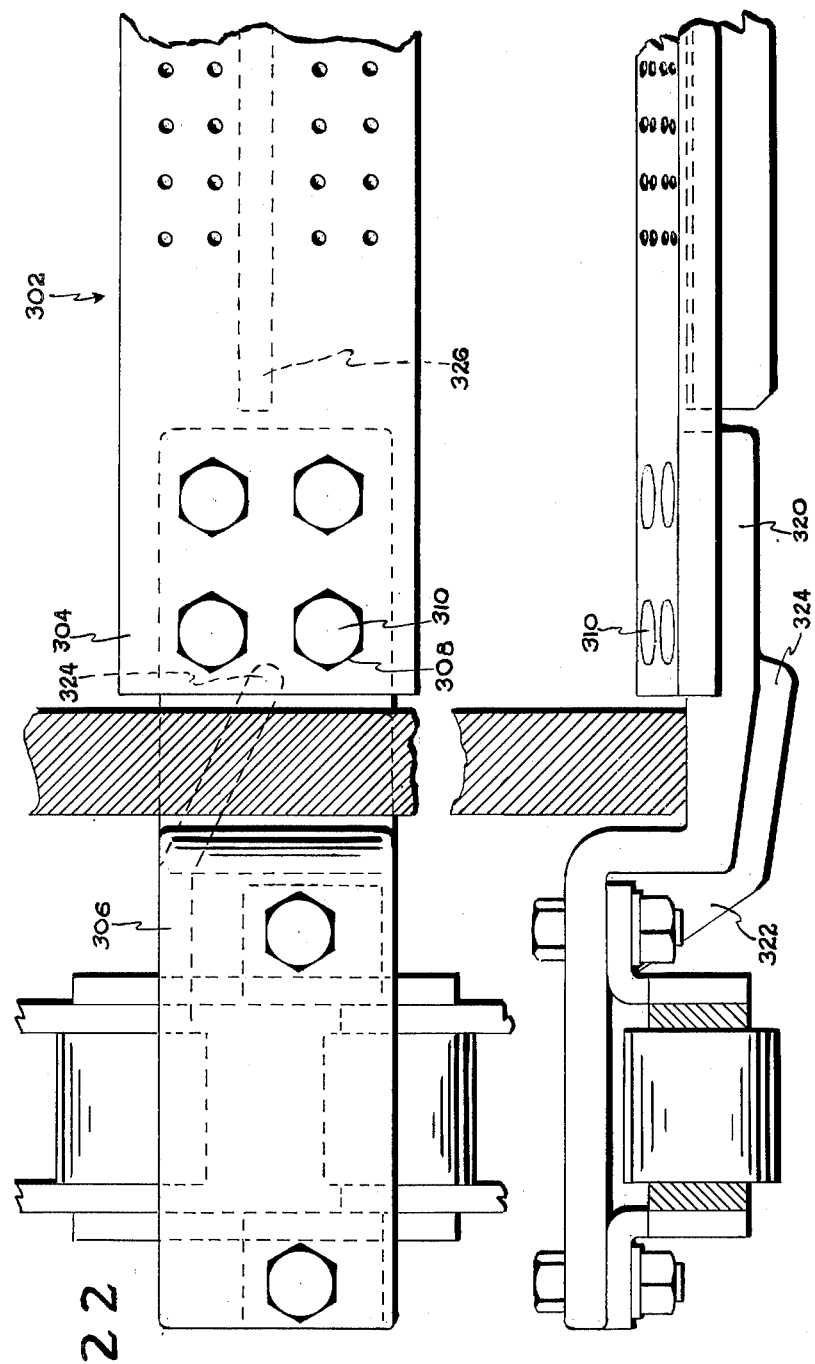

United States Patent Office 2,716,310
Patented Aug. 30, 1955

2,716,310

BLASTING APPARATUS

Ralph W. Moore, Hagerstown, Md., assignor to Pangborn Corporation, Hagerstown, Md., a corporation of Maryland Application November 28, 1952, Serial No. 322,896

14 Claims. (Cl. 51—13)

This invention relates to blasting apparatus, more particularly to such apparatus in which work pieces are subjected to the mechanical impingement effects of a vigorously projected stream of abrasive particles.

Prior blasting apparatuses of this type have had many troublesome characteristics, including the adequate sealing of the blasting zone against the escape of particles that vigorously rebound in all directions, as well as difficulties in the tumbling of the work pieces as they are blasted. By way of example, an ordinary door, as shown in U. S. Patent No. 2,447,802, granted August 24, 1948, is not too satisfactory a seal for such an apparatus inasmuch as the door guides, if arranged to seal the door edges, trap flying particles that cause the door to become jammed. In addition, the use of prior work-tumbling arrangement usually causes the smaller work pieces or small projections of larger work pieces to be pinched between relatively movable portions of the tumbler, not infrequently causing the work pieces to be damaged.

Among the objects of the present invention is the provision of work blasting equipment that avoids the above and related disadvantages.

Additional objects of the present invention include the provision of a novel and simple door arrangement that gives very effective sealing with no tendency to jam.

Further objects of the invention include the provision of novel work-handling mechanism that is highly effective in handling the work pieces that are being treated, with a minimum of damage.

The above as well as still further objects of the present invention will be more clearly understood from the following description of several of its exemplifications, reference being made to the appended drawings wherein:

Fig. 1 is a perspective view, with parts broken away, of one form of the blasting apparatus exemplifying the present invention;

Fig. 4 is a perspective view, with parts broken away, of the upper portion of the apparatus of Fig. 1, showing the internal features thereof in greater detail;

Fig. 5 is a vertical sectional view of the apparatus o Fig. 1 showing the door assembly in greater detail, the door being in open position;

Fig. 6 is a sectional view similar to Fig. 5 with portions broken away, showing the door closed and also showing the use of an auxiliary modification in accordance with the present invention;

Fig. 7 is a fragmentary horizontal sectional view showing a detail of the door assembly;

Figs. 8 and 9 are partial front and vertical sectional views respectively showing the door construction in enlarged detail;

Fig. 9A is a vertical sectional view of a portion of the control structure of the apparatus of Fig. 1;

Figs. 10 and 11 are perspective and vertical sectional views of a portion of the drive mechanism of the apparatus of Fig. 1;

Fig. 12 is a vertical section showing a portion of the work-tumbling mechanism of the apparatus of Fig. 1;

Figs. 13 and 14 are views generally similar to Figs. 5 and 6 of a modified embodiment of the present invention;

Figs. 15 and 16 are vertical sectional and plan views respectively, showing a detail of the work-tumbling features of the construction of Figs. 13 and 14;

Figure 19:
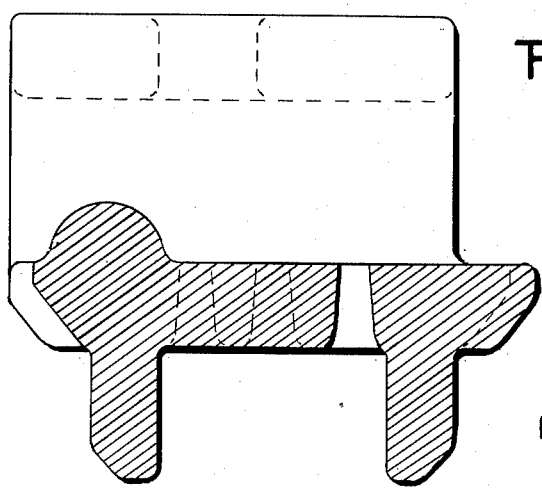

Figs. 17, 18 and 19 are sectional views taken along the lines 17—17, 18—18 and 19—19 respectively, of Fig. 16;

Fig. 20 is a plan view similar to Fig. 16 of an alternate tumbling construction encompassed by the present invention; and Figs. 21, 22 and 23 are fragmentary views generally similar to Figs. 13, 16 and 17 respectively of a still further tumbling construction illustrative of the present invention.

According to the present invention there is provided an enclosed blasting apparatus having a closure for a work blasting zone in which the closure includes a first movable panel connected to move into and out of an opening-covering position, and a second movable panel of pliable material having one end secured to the first panel and the opposite end fixed to cause the operation of the first panel to carry the second panel with it into and out of spaced opening-covering position.

In a preferred form the first panel is a rubber covered metal mesh slide, the second panel is a rubber curtain looped between the slide and a support, the loop being biased toward opening-covering position, the first panel is arranged to be rolled up around the roller when it is opened, and the work being blasted is held in a looped conveyor which is positioned adjacent the closure.

The combination of the invention is particularly effective with a conveyor of perforated rubber construction, although the conveyor can also be a metal slat assembly in which the ends of the slat are offset to seal behind side guides for the conveyor, and the adjacent edges of the slats have intermeshing serrations. For rubber conveyors, it is particularly desirable to have the guides in the form of discs that toe out in the central portion of the work-handling zone, and to provide an idler take-up adjustment in the form of a roll arranged to be movable in a direction parallel to the path of the conveyor as it moves toward this roll. In some cases, it is desirable to have a deflector gate positioned at the lower portion of the closure and counterbalanced to tilt up within the work-handling zone except when the work is being unloaded.

Referring to the drawings, Figs. 1 to 12 inclusive show one form of the invention in which a work-blasting zone is defined by a housing 30 mounted on side supports 32. The front of the housing has an opening 34 through which work pieces can be loaded and unloaded. Within the housing, as more clearly shown in Fig. 3, there is a conveyor 36 which is shown as made of an endless belt of solid rubber. The belt is fitted around a set of rollers 41, 42, 43, arranged in generally concave fashion. A pair of guide discs 51, 52 are rotatably mounted in the walls of the housing as by means of the stub shafts 54 suitably journalled in bearing supports 56. These discs act as guides and keep the belt 36 looped in a generally U-shaped trough in which work pieces are tumbled. The U of the trough is also tilted from the vertical in the conventional manner to better hold the work pieces as they try to climb up with the ascending run of the belt. The outer surface of the belt, as shown, is provided with integrally formed ribs 58, and the side edges can also be made thicker than the work-carrying portion, and if desired, of the same thickness as the ribbed portion of the belt. The belt is conveniently driven as by a pulley assembly 57 secured to the shaft 59 which carries roller 42, the pulley being rotated as by electric motor 61.

Above the trough formed by the belt, there is mounted in the housing a blastant projecting device shown in Fig. 1 as a centrifugal throwing wheel assembly 60 driven as by electric motor 62. The throwing wheel assembly is surrounded by its own housing where the wheel projects from housing 30. The particular details of the throwing wheel itself form no part of the present invention, and any desired wheel construction can be used such as the one described in copending Powell application Serial No. 311,122, filed September 23, 1952. Alternatively a plurality of throwing wheels, or one or more air blast jets can be used to project the blastant particles into the housing 60. It is preferred that where the throwing wheel is used, the plane of the wheel be disposed transversely of the work-tumbling belt.

The wheel is supplied with abrasive particles by way of chute 64 which is fed from the hopper 66 in which a quantity of these particles is kept. After projection against the work pieces, the abrasive particles fall through perforations 68 provided throughout the belt and drop to the lower parts of housing 30 where they are led to a bucket elevator 70 and thereby lifted into a return conduit 72 so that they can be returned to the hopper 66 and thereby automatically reused.

The opening 34 in the housing 30 has a pair of channel-shaped side guides 76 between which is slidably mounted a door panel 80. This panel is of elongated pliable construction and has an upper end wound around and secured to a head roll 82. In addition, there is secured to the lower portion of the panel 80 one end of a flexible curtain 84, the other end of which curtain is fastened to a fixed support 86. Between its two ends the curtain 84 hangs as a loop. It is preferred that the loop be biased downwardly as by fitting within the loop a biasing roller 90 which is free or unconnected and merely rests in the loop so that by its weight it urges the looped portion of the curtain down as far as it can go.

The panel 80 is preferably of rubber-backed metal mesh construction. As shown in Figs. 8 and 9 a suitable metal mesh can be made by flattening wire spirals 81 and linking together such flattened spirals in intermeshed position by means of relatively long rods 83 inserted through the intermeshing loops. Some of the linking rods 83 or separate rods 85 that are also threaded through the spirals, project out from both side edges of the panel and carry end rollers 92 that fit into the panel guides 76. The rods can be kept from slipping out as by welding or brazing or otherwise securing them to one or more turns of one of the spirals which the individual rods link together. By way of example, the rods 83, 85 can each be brazed to the spirals at only one or both ends. Guide-engaging rollers 92, held by washers 91 and cotter pin 93, or snap-ring, on the ends of some or all of the rods simplify the raising and lowering of the door. The flattened spirals need not be of identical construction and some can be of smaller or greater width than others.

Figure 2:
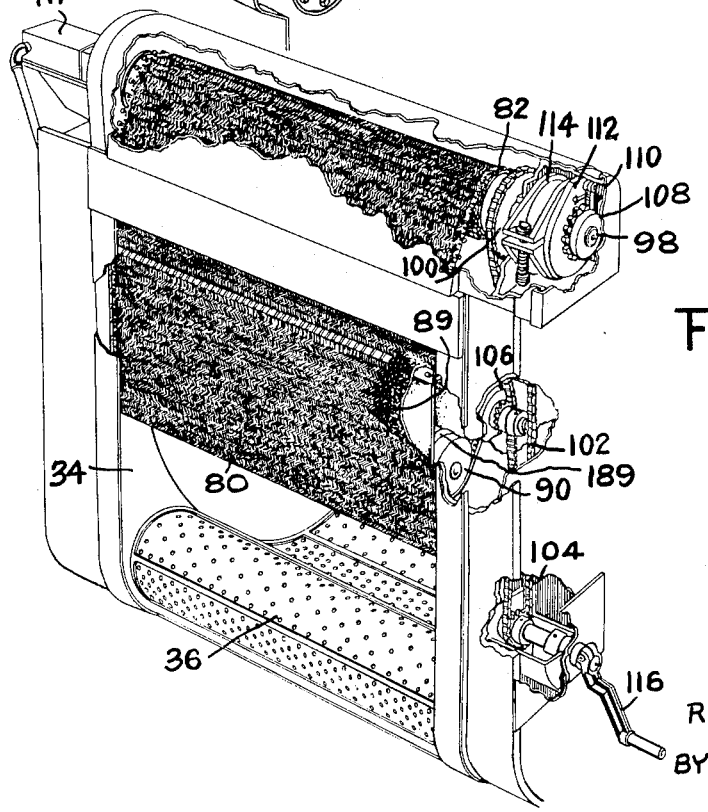
Fig. 2 is a perspective detail view, with parts broken away, of a portion of the apparatus of Fig. 1, showing details of the door-operating mechanism.
Figure 14:
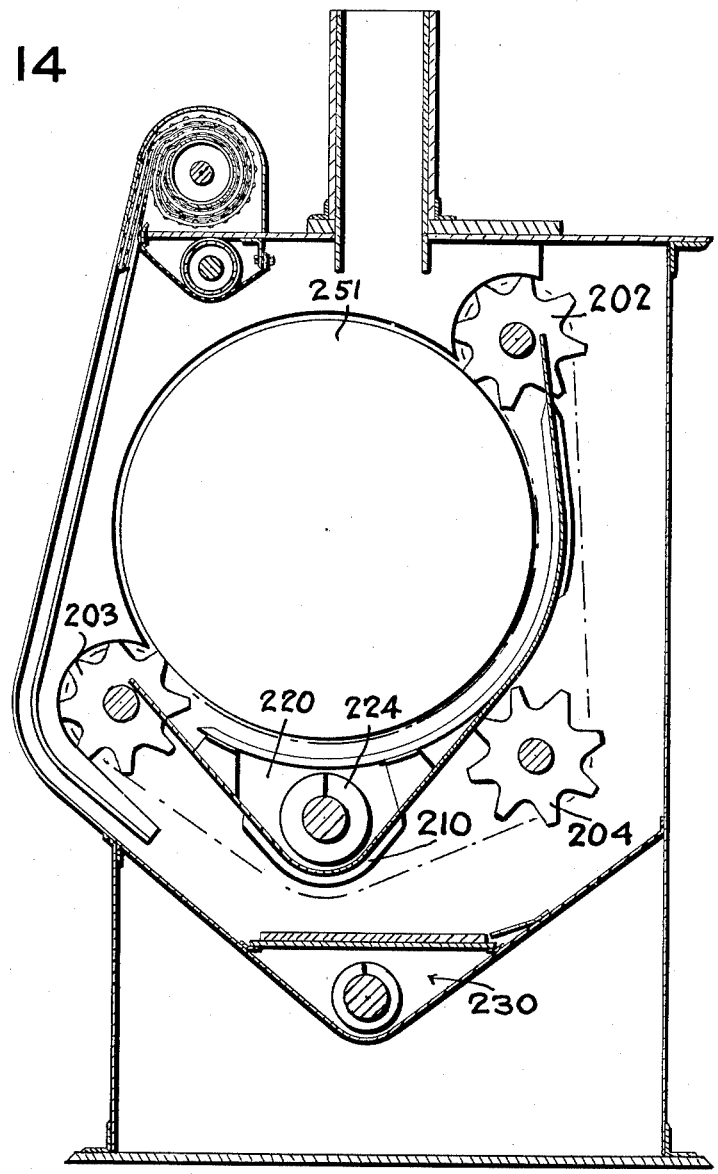

Near the roll-up top end of the panel narrower spirals provide a desirable increase in flexibility so that this end will roll up better around the relatively small diameter of the head roll 82. Where the curtain 84 is attached, a wider spiral can be used to make room for the insertion of a securing bar 99 into which curtain anchoring screws 101 can be threadedly received as indicated in Figs. 2, 8 and 9. Washers 103 provide suitable engagement between the heads of screws 101 and the pliable curtain 84, but can be replaced by a continuous strip that runs the entire width of the curtain or panel.

The panel end secured to head roll 82 can be fitted with an end plate 87 through perforations in which marginal portions of the mesh can be threaded. This plate is conveniently fastened to the head roll 82 as by means of keyhole-shaped slots 94 which interlock with headed pins 95. The slots 94 are dimensioned so that the head of the pin 95 will fit through the lower portion having the larger diameter, but will not fit through the upper portion of the slot. The shanks of the pin 95, however, will pass through these narrower portions. In mounting the door panel plate 87 is placed against the head roll so that slots 94 slip over the heads of the pins 95. The plate is then pulled downwardly to carry the narrow portions of the slots over the shanks of the pins, thereby interlocking the members. Additional bolts 88 can then be fastened into roll 82 in a position that keeps plate 87 from moving up into slot-engagement position. The upper edge of the door is accordingly kept from inadvertently detaching itself. This method of attachment provides a secure yet flexible fastening, easy to operate, which allows the door to center itself to the roll contour.

The mesh, or the portion of it that is used to cover opening 34, is covered with a sheet of rubber 89 which is preferably although not necessarily, adhered to the mesh as by cementing or vulcanizing.

For operating the closure, the head roll 82 is mounted on a shaft 98 that also carries a sprocket 100. A chain 102 is looped around this sprocket and also around a crank sprocket 104 at the lower portion of the housing. An intermediate idler sprocket 106 can also be provided to keep this chain properly tensioned. The head roll shaft 98 is extended out at one side and to this extension is fixed a ratchet wheel 108 that cooperates with a pawl 110. The pawl is carried on a flange 112 that forms part of a collar freely rotatable around shaft 98. However, the collar is in turn surrounded by brake shoes 114 which frictionally engage it and keep it from rotating except where the rotating force is sufficiently large to cause the brake shoes to slip. The pawl 110 is biased in such a manner that it permits ratchet gear 108 to freely rotate in the panel opening direction without rotating collar 112. On the other hand when shaft 98 is rotated in panel lowering direction, the pawl 110 is engaged by the ratchet and causes the collar to be driven, thereby applying the braking resistance. For manipulating the door, crank sprocket 104 is conveniently connected to a crank handle 116 which projects out from one side of the housing and through a cover 117.

A feature of the present invention is the fact that the closure is composed of two separate portions spaced from each other and each large enough to substantially completely cover the opening 34. It will be noted from Fig. 6 that the curtain 84 is so arranged that with the outer panel 80 in closed position, the loop of the curtain descends very close to the adjacent portion of conveyor 36. The curtain therefore is a very effective seal all by itself. Accordingly, the panel 80 need not be tightly sealed in its side guides 76, and its top and bottom edges can also be left in merely overlapping relationship with the edges of the opening 34. Thus the lower edge of the opening need not be provided with any panel contacting or sealing members. This avoids the use of a construction having a configuration that causes particles to be trapped in the bottom opening of the door to thereby prevent proper door closure. At that same time the lower edge of the closure by merely overlapping the lower edge of the opening 34 provides all the desired sealing in conjunction with curtain 84. Of considerable importance is the fact that the side guides for panel 80 can be made to have a very loose fit. Any particles that reach these guides will therefore readily drop along the guides and out through the bottom without in any way tending to become wedged against any part of the panel 80.

Curtain 84 also makes a very desirable baffle or cushioning arrangement for the door. Any work pieces that are tumbled towards the door are stopped by first striking the curtain. As a result, there is substantially no tendency for the door to be bulged outwardly during operations even when a full load of very heavy work pieces are tumbled.

To help assure that the curtain 84 hangs down and effectively obstructs the escape of blastant particles, it can be weighted as by roller 85 that merely rests on the intermediate portions of the curtain. The weight of this roller, when added to that of the suspended portion of the curtain will urge the curtain downwardly toward the position shown in Fig. 6. Inasmuch as blastant particles generally make their way into the space over the bight of the curtain, it is advisable to perforate the lowest portion of the bight as indicated at 87 in Fig. 6. These perforations can extend over a considerable portion of the bight or can be limited to the portion immediately below roller 85, where such roller is used. In the last alternative, the roller should be arranged to permit blastant particles to reach the perforations 87, as by providing the periphery of the roller with spacer ribs 189. In one highly practical form, these ribs are merely rubber bands held in place around the roller, as by means of their own elasticity.

The apparatus of Fig. 1 is also equipped with control assembly 119 including an abrasive flow control 120 shown as a conveniently located lever connected as by a flexible cable 122 with a valve 124 in the blastant supply circuit closely adjacent spout 64. As shown more clearly in Fig. 9A, valve 124 can be in the form of a dish-shaped gate pivoted as indicated at 125 to swing to and fro from a position under a spout 127 that forms the blastant outlet under hopper 66. In Fig. 9A the gate 124 is shown in full lines in the closed position where it keeps the blastant from feeding into the wheel feeding chute 64. The valve operates, notwithstanding some clearance between the gate 124 and the adjacent spout 127. This operation is based upon the fact that the abrasive will, in dropping, normally assume an angle of repose of about 30° to 40°. In other words, in falling on a surface it will form a cone having an angle of revolution corresponding to the complement of the angle of repose. The spacing between the bottom of spout 127 and the peripheral limits of the gate 124 is such that the conical surface they fall in corresponds to an angle of repose smaller than 30°, preferably even smaller than 20°. In dropping on the closed gate 124, the abrasive will accordingly pile up until its angle of repose causes the pile to block the bottom of spout 127 before any of the abrasive spills over the edges of the gate.

In the form shown, the gate can be biased as by coiled spring 129 toward the open position which is shown in phantom (dot-dash) view. Accordingly, if the control lever 120 is released, the gate 124 will be automatically opened and abrasive will flow into the throwing wheel 60. When it is desired to cut off the flow of abrasive, as for example during the time the work articles are being unloaded from the machine, the control handle 120 can then be operated to pull gate 124 down into the full line position shown in Fig. 9A. An additional blastant feed control can also be provided as shown in Fig. 9A by means of a slide 131 which is conveniently fitted in a suitably shaped guide panel 133 above spout 127. Slide 131 has a central feed opening 135 which can either be moved out from above spout 127 to block the passage of blastant, or it can be positioned over the spout to permit such passage. Operation of slide 131 can be readily effected by means of a bent-over ear 139 which is conveniently grasped when desired.

As shown in Figs. 1 and 4, the discharge end of hopper 66 can also include a clean-out passageway 67 through which foreign objects or other obstructions of the blastant feed can be removed or other maintenance work effected. The clean-out opening need not be covered, but if left uncovered, provision should be made to prevent overflow of abrasive, as by means of a wall portion 69 depending from above the opening to a level sufficiently low to sub-tend with the lowest portion of opening 67, an angle smaller than the angle of repose.

The interior of the housing is also arranged to be connected with a suction line to draw off all finely divided materials that are produced during the blasting and may tend to leak out into the surrounding air. For this purpose a suction line 126 is shown as connected to the housing through a hood 128. The suction can also be used to separate fines that are brought up by the conveyor 70. An additional suction take-off 130 is conveniently connected as by means of ducts 132 with the return conduit 72. These ducts 132 communicate with a gap 134 below a chute 136 and suck in air through a screen 137 covering an air inlet opening 138. Below gap 134 a deflector plate 140 is positioned to catch the lighter particles that tend to be moved over along with the sucked in air, and causes the deflected particles to drop into an opening 142 that leads to a refuse line 144.

The recycled particles that are heavy enough not to be deflected, drop through a wire catcher 146 shown as a pair of horizontally positioned perforated plates vertically spaced from each other with their perforations offset. For convenience in cleaning out the wire catcher, these plates can be mounted as part of a drawer 148 having a handle 150 by means of which the drawer can be readily removed and replaced.

The hopper 66 is also shown as provided with an overflow duct 152 through which recycled particles will drop when the total quantity of blastant particles in the hopper exceeds any predetermined level. The overflowing particles return to the elevator by means of the side boot 154, but in dropping into this boot, fall in exposed condition through some distance so that their presence is easily noted. When the operator of the apparatus does not see particles falling from duct 152, he will then know that the level in hopper 66 is too low, and that it is time to add additional blastant as by way of an auxiliary boot (not shown) at the bottom of the elevator 70.

For best results, the rubber conveyor belt 36 is guided in its U-shaped travel around discs 52 that are not perfectly perpendicular to the belt itself. As shown in Fig. 12, it is preferred that these discs be rotatably mounted about axes that are symmetrically tilted with respect to the horizontal so that at the central portion of the U, the discs toe out. Even a small amount of toe-out is helpful, and a toe-out of about ⅛″ to ⅜″ more than the diametrically opposite portions of the disc is all that is needed.

Any convenient arrangement can be provided to make this toe out possible. In the form illustrated in Fig. 12, discs 102 are mounted on stub shafts 103 as by means of flange bushings 105 which are in turn journalled by bearings 107 in journal casings 109. The journal casings extend through openings 111 in the wall of main housing 30 and each is adjustably held in place by means of a series of positioning bolts 113, 115. This series of bolts is divided into two groups one of which as shown for the bolt 113, tends to pull the journal casings over toward the internal side of the housing 30, and the other group of bolts 65 tends to push the journal casings in the opposite direction. Both groups of bolts are adjusted to provide the desired tilt.

Figure 3:
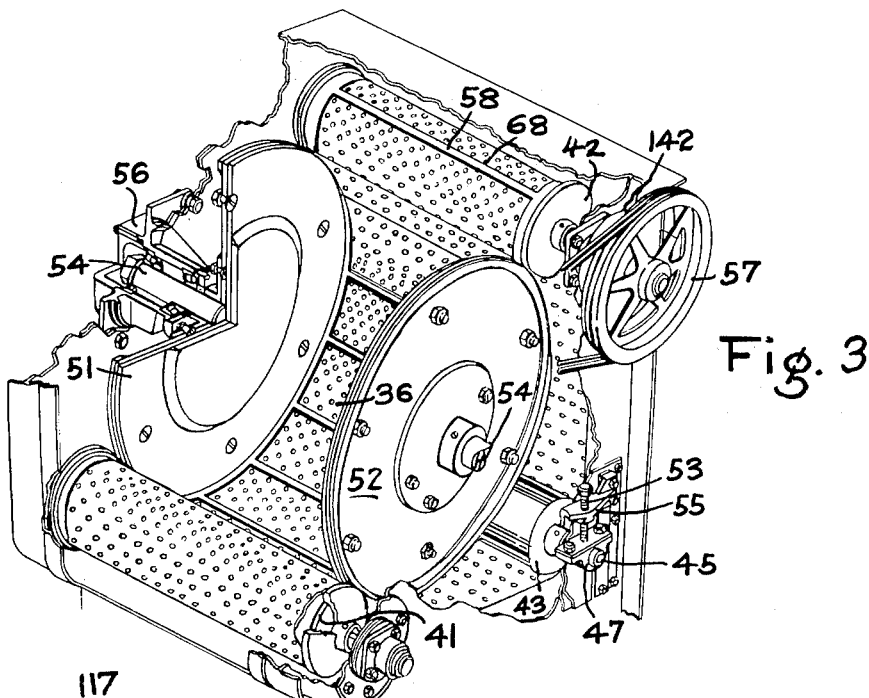
Fig. 3 is a perspective view of some of the internal details of the apparatus of Fig. 1, particularly showing the work-tumbling features.

It has also been found that the rubber conveyor belt operates most smoothly when idler roller 43 is provided with an adjustment tension increasing mechanism that moves it in the direction in which the belt itself moves as it approaches the roller. One effective arrangement for this purpose is shown in Figs. 1 and 3. Here the roller 43 carries externally projecting shaft ends 45 each received in movable journal blocks 47. These blocks are slidably received in a vertically extending panel 49 of a guide fitting 51 fastened to the outside of housing 30. Adjustment is effected by means of a screw 53 threadedly received in a fixed arm 55 and having one end in abutting engagement with journal block 47. Journals 188 for the idler roller 41 can be fixed in place, that is non-adjustable.

By rotating the screws 53 on either side of the idler roller 43, the roller can be raised or lowered to thereby vary the tension of the belt 36. Athough more adjustment travel has to be provided for the idler roller 43 than if the adjustment were in the plane of symmetry, that is in the plane defined by shafts 45 and the centers of disc 52, the conveyor moves so much better with the illustrated adjustment that any added expense is entirely offset.

According to an additional feature of the present invention, the conveyor drive is fitted with an automatically releasing overload protection. This is very helpful should the conveyor become jammed for one reason or another. A certain amount of such jamming appears to be unavoidable even though the conveyor carrying the work is rubber and leaves no chinks within which small work pieces or projections of large work pieces can become pinched.

In Figs. 3, 10 and 11 there is shown an overload protecting arrangement in the form of a gear box 183 that connects drive pulley 57 with the drive roller 42. The gear box 183 carries a drive shaft 185 that projects out from one side of the box and a driven shaft 186 that projects out from the other side. These shafts are suitably journalled and carry on their inner ends gears 155 and 156 respectively. Shaft 186 can be hollow, as indicated, and shaft 185 can be arranged to project into the hollow of shaft 186 for improving the bearing supports of these two shafts.

An offset countershaft 187 is also journalled within the gear box 183 and this shaft carries gears 164, 166 which are arranged to mesh with the gears 155, 156 respectively. The box 183 can also carry a quantity of lubricant and can be made in two sections bolted together as by means of bolts 160, 162.

Suspended from a portion of housing 30, alongside the gear box 183 is a torque arm 170 pivoted as by means of pin 172. The lower end of arm 170 is forked to receive a latch plate 174 which is pivoted in place by pin 176. A socket 180 in plate 174 is shaped to receive the head or shoulder provided on bolts 162, and the plate can be latched in bolt-receiving position by means of a spring loaded plunger 182 that engages in a position notch 184. A side wall portion of socket 162 can be resiliently held as by spring 164 biased at one end against a portion of the latch plate and at the other end holding a movable portion of the socket wall.

As so arranged, the driving of pulley 57 by a main drive motor 61 tends to drive shaft 146 by means of the gears 155, 164, 166, 156. At the same time, this gearing also tends to make gear box 183 rotate around shaft 186. When the gear box is kept from rotating by latched engagement with arm 170, the drive will be transmitted exclusively to shaft 186. However, should there be too much resistance for shaft 186 to rotate, the torque applied to box 183 will cause the latched bolt 162 to pivot latch plate 174 out of its path, releasing arm 170 permitting it to drop out of the way and permitting the box 183 to rotate freely. This relieves shaft 186 of substantially all driving force so that it cannot continue to rotate and damage jammed work pieces or the apparatus itself. To reseat the drive it is only necessary to return latch plate 174 to the latched position and reengage it with one of the bolts 162.

The embodiment of the invention shown in Figs. 13 to 18 inclusive has a metal slat conveyor belt rather than the rubber belt of the previous figures, but otherwise can be quite similar. Metal slats are much more suitable for the larger sizes of conveyors or heavier work pieces. Such slats are held between parallel chains that are received over sprockets 202, 203, 204. As in the construction of Fig. 1, the upper sprockets 202 can be the drive connection for the conveyor, sprockets 204 a tension adjustment set, and the remaining sprockets merely for positioning purposes. In addition, however, a supplemental sprocket or fixed friction guide 210 can also be provided to increase the spacing between the upper and lower flights of the conveyor. In this spacing there can be positioned a blastant collecting unit 220 shown as including a trough 222 and a worm or spiral 224 extending horizontally just over the lowest portions of the trough. Another such blastant collecting unit 230 can also be positioned under the lower flight and can utilize the bottom walls of the main housing as its trough. Both collecting units can discharge the collected blastant into the same elevator boot for recycling purposes. The same arrangement is suitable for the rubber conveyor of the apparatus of Fig. 1, although if desired only the lower collecting unit 230 can be used with either or both apparatuses.

Additional conveyor guide structure can also be provided in the form of a fixed friction guide surface 234 to help guide the upper flight of the conveyor around its U-shaped travel path.

A further feature of the present invention is the provision of conveyor slats that have their ends offset and fitted in overlapping relationship with respect to the outsides of the drum disc guides 251. The specific construction of the slats is more particularly shown in Figs. 16 to 18 inclusive, as including a central work-carrying span 260 with offset ends 262. The ends are connected to a roller chain by means of ears 264 secured to the ends 262 by bolts 266. In the interest of simplicity the ears can be formed as integral extensions of links 270, 272 of the chain. Rollers 274 held on pins 276 that pin the links together, are kept in place by cotter keys 278 to complete the chain. The successive slat ends are shown in Fig. 16 as fastened to the ears of the successive chain links so that the ears 264 are provided on both inner links 272 and outer links 270 of each chain.

The central span of the slats 260 are perforated as indicated at 280 and are closely spaced together. At their adjacent edges the spans are serrated or scalloped as shown at 284 with the protuberances of the adjacent scallops offset so that they are in mesh-like or mating juxtaposition. The spacing between the scalloped edges should be sufficient to keep the slats from binding against each other as they go around the conveyor guide path.

A still further feature of the present invention is that the pivoting of the slat ends in the manner shown makes it possible for the work-engaging portions of the slat to go through the entire range of travel without appreciably changing the distance between adjacent edges. This greatly reduces the pinching of work pieces between slats. As will be more clearly seen in Figs. 15, 17 and 18, the use of slat-mounting pivots close to the path along which the work-engaging surfaces of the slats move, causes the central spans of the slat to pivot about an axis which lies alongside this surface. As a result, during the movement of the conveyor belt around convex and concave portions of its travel path, the clearance between adjacent slots remains substantially constant and the same as it is in straight portions of the path. In fact, by varying the offset and/or slightly shifting the spacing of pins 276 from the offset ends 262, the travel path of the spans 260 can be adjusted to any desired location relative to the travel path of the pins. In this way, the central spans can be arranged to move in the upper flight around an arcuate path having a radius larger than the slat pivot path so that the slat spans tend to move apart slightly at the convex portions of the conveyor. Inasmuch as the work is only handled at the concave portions of the barrel, there will still be a very much reduced tendency for the work to be pinched between the slats.

However, the slat spans can also be arranged to trace out exactly the path of the roller pins, or can even be arranged to move slightly on the inside of the roller pin travel path. In the last modification the slat spans will actually move apart as they move into the concave portions of the path so that it will be substantially impossible for them to pinch the work pieces.

For more positive lifting engagement with the work, the slat span 260 can also be ribbed, as shown at 286, on the work-contacting surface. In addition, the slat spans, particularly if of substantial length, can be reenforced as by means of additional ribs 288 which can be located on the opposite face of each slat. In the illustrated construction, two such ribs 288 are shown on the back of each slat, and in addition a gusset flange 290 continues from one of these ribs over to the offset ends 262 to further rigidify the slat. Perforations 280 are large enough to permit blastant particles to drop through. The perforations can be cylindrical or tapered as more clearly shown in Fig. 19.

Figure 15:
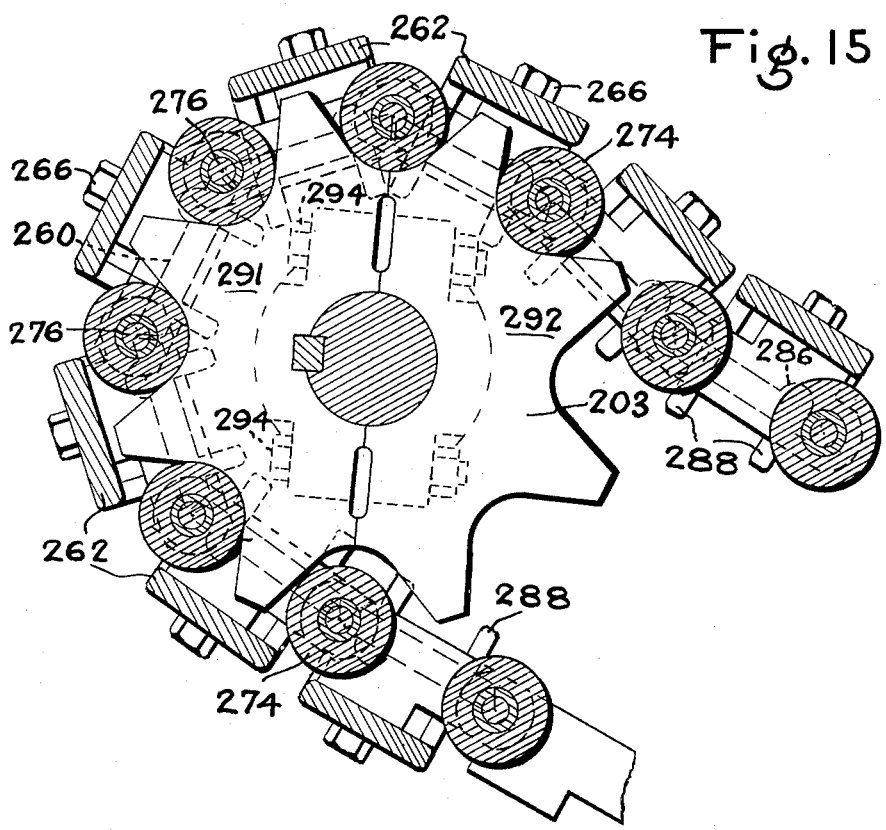

As shown in Fig. 15, the sprockets around which the conveyor is guided can be of two-piece construction, particularly with the larger sizes of sprockets. The two pieces are shown in the figure at 291 and 292, and are fastened together by means of bolts 294 which pass through and clamp together split hub sections each formed on one of the sprocket halves.

Instead of having the slat edges serrated as shown in the construction of Fig. 16, the serrations can be arranged to present a more blunt projection. This is shown in Fig. 20 where the outer faces of the projecting edge portions 285 extend in a direction parallel to the longitudinal slat axis. The recessed portions 287 of these edges can also be correspondingly oriented to better mesh with the projections 285.

An alternate slat construction of the present invention has slats that overlap each other. This type of construction is particularly effective in keeping work articles from becoming pinched. Figs. 21, 22 and 23 illustrate a suitable form for this construction. The slats here are shown at 302 as having a body portion 304 separate from, but secured to end portions 306 that may be offset as in the construction of Fig. 16. Fig. 21 shows the end portions bolted to the body portions by bolts 308 having countersunk heads 310.

The slat bodies 304 may be generally rectangularly shaped plates in the interest of simplicity and are wider than the ends 306 so that the bodies can overlap each other as shown at 312 in Fig. 21. The overlap can be sufficient to cover any separation that the slats might undergo during the travel around the conveyor loop. About one inch of overlap is generally more than enough to keep the slats from separating as at 314 by reason of movement around a portion of the loop having a diameter as small as 10 inches, even where the above-described advantages of offsetting the slat ends is not utilized.

The edges of the slats are advantageously rounded or beveled as indicated at 316 to permit the overlapping portions to tilt with respect to each other as the slats move around the conveyor loop. In addition the slat bodies themselves can be tilted somewhat from the conveyor travel path to suitably orient the overlapping. As in the previous construction the slat bodies preferably include perforations 318 for the blastant particles to drop through.

The slat ends 306 are shown as having body securing lugs 320 that are twisted to provide a slat body anchorage having the desired tilt. A reenforcing rib having a web 322 as in the above-mentioned constructions can have this web continued as a transversely extending flange 324. Additional strengthening rib 326 is advantageously provided on the slat bodies 304, as by welding. The slat ends 306 can be somewhat narrower near the bodies so that the ends need not be overlapped.

The slat overlap can be arranged to provide protuberances that help engage the work articles and lift them up along with the upwardly moving parts of the upper flight of the conveyor. On the other hand however the overlap can be oriented in the opposite direction so that the lifting effect of the protuberances is only utilized for unloading. However work engaging additional ribs may be provided on the work contacting face of the slat bodies, as by welding on additional strips of metal. In fact such an additional rib can take the place of the reenforcing rib 326.

The simple slat body construction of Figs. 21 to 23 can be used with or without the offset ends. Where the ends are not offset, the slat bodies can be merely extended long enough to provide the necessary chain anchorages.

The apparatus of the present invention is operated by placing work pieces to be blasted in the concave portion of the conveyor and driving the conveyor in the direction that carries its upper flight from the low end of the U to the high end. While the conveyor is moving in this direction the blastant particles are projected into the U so that they strike against the work pieces. The work pieces moved by the conveyor are lifted up toward the high side of the upper flight, and when the conveyor becomes too steep for them to climb with it, they fall back, dropping down to a lower portion. This effects a tumbling action so that the individual work pieces present all their surfaces exposed to the blast after a sufficient number of conveyor travel cycles have been completed. A large mass of work pieces can be thus handled in a single operation with as much as about ⅓ of the U completely filled by the work pieces.

When the blasting has progressed for a sufficiently long time the work pieces can be unloaded by opening the door panel and reversing the travel of the conveyor. By reason of the low height of the conveyor at the door opening, the work pieces are readily carried over the forward end of the conveyor and drop from it. They can be caught in any suitable manner for example by merely placing a tote box or transverse conveyor under the front end of the tumbling conveyor.

Loading of the apparatus can be effected either manually or by means of an automatic loader such as of the type which provides a low level bucket mounted on guides to tilt as it is lifted into the doorway 34. The tilting is arranged to be sufficient to dump its load of work pieces into the conveyor U. One suitable form of automatic loading apparatus for this purpose is shown in U. S. Patent No. 2,131,771, granted October 4, 1938.

Where the blasting in the above apparatus is of the centrifugal type which uses a wheel of high rotational inertia, it is desirable to rapidly stop the wheel rotation when the door panel is open. The shutting off of the flow of abrasive by closing valve 124 does not immediately terminate the blasting inasmuch as the supply of these particles usually stores up in chute 64 and must first be exhausted. The last little bit of these particles may not feed through properly and may hang back until loosened by vibration or the like. The rapid stopping of the wheel avoids time delays waiting for the abrasive particles to no longer be projected by the wheel. This result is conveniently effected by reversing the energization of its drive motor 62 so that it rapidly decelerates the rotation of the wheel. The reverse energization is accomplished in any convenient manner as by means of a separate starting switch box designed to start the motor in the reverse direction and connected in the wheel-stopping control. The reversing energization may also be combined with a brake mechanism of either mechanical or electro-dynamic type. In any case the reversing mechanism is preferably arranged to be only connected for a short period of time, automatically dropping out before the motor rotation actually reverses.

To further reduce any likelihood of improper operation, the apparatus can also be provided with interlock controls. By way of example, a limit switch can be linked to the door operation, as by mounting such a switch 177 (see Fig. 2) opposite the end of head roller shaft 98, and connecting the switch to automatically stop the throwing wheel when the door panel is opened, and prevent the starting of the throwing wheel until the door is again closed. The limit switch can also be connected to prevent the reversing of the conveyor travel unless the door is opened sufficiently to permit work pieces to be discharged over the front end of the conveyor.

Where it is desired to automatically unload work articles some distance in front of the forward end of the conveyor, the apparatus can be provided with a suitably positioned unloading chute or deflector. Such a deflector can be either externally fitted below the door panel, or as indicated in Fig. 6 at 190, can be placed internally of the main housing 30. Deflector 190 is pivoted at 192, and is preferably counterweighted as shown at 194. The retraction of the deflector toward the conveyor should be limited as by stop 196 if it is to be kept from contacting and abrading the conveyor. The counterweight can be arranged so that when the conveyor is rotated in the unloading direction, work articles will be carried over its front end to drop on deflector 190 and cause it to swing downwardly to the position shown in dash lines in Fig. 6, for example. The work pieces will then slide down the deflector 190 into a suitably positioned collector such as a tote box or an externally traveling conveyor belt. The counterweight is preferably adjusted to permit the deflector 190 to remain in the dropped position even when no work articles are on it, so that the deflector does not bob up and down when the unloading is irregular. Alternatively, however, the counterweighting can be arranged to automatically retract the deflector in the position shown in full lines in Fig. 6 so that no manual attention is needed before the door panel is closed.

Instead of having the work tumbling conveyor in the form of a series of slats, or as a rubber belt, it can also be made in different manners. By way of example and particularly for large conveyors, it can have a rubber belt held on a set of slats such as the set shown in the construction of Figs. 13 and 14. The rubber belt either when used alone or with the slats need not be of endless construction, but can have a transversely extending seam to which the ends are both vulcanized or held together between opposing plates clamped against each other by bolts. Where separate elements, such as metal clamps, are used in connection with the rubber belt, and the separate elements project sufficiently to be abraded by the work pieces and/or the blastant particles, such elements are preferably covered by rubber flaps.

Rubber conveyor belts are advisedly reenforced as by molding in or affixing to them strengthening and/or rigidifying elements such as textile fabrics, metal wire, rods or plates. By way of example the rubber can be molded around a laminated assembly of canvas layers, and to the molded product, a series of metal plates can be secured as by bolting to either the work engaging (front) or opposite (rear) face of the belt. In order to reduce the amount of metal exposed for engagement by the work articles or blastant particles, the metal reenforcing members are preferably bolted to the rear face of the belt with the heads of the bolts seated in a countersunk opening in the front face.

As many apparently widely different embodiments of this invention may be made without departing from the spirit and scope hereof, it is to be understood that the invention is not limited to the specific embodiments hereof, except as defined in the appended claims.

What is claimed is:

1. In combination, a blasting apparatus having a work-blasting zone, an opening through which the work is loaded into and unloaded from said zone, guide means formed on at least a portion of the periphery of said opening, and a closure for said opening, said closure comprising a first movable panel having one end mounted on a roller and arranged to move into and out of opening-covering position, said closure being guided in its movement by said guide means, and a second movable panel of pliable material having one end secured to said first panel and the opposite end fixedly positioned remotely from said opening, the movement of the first panel into and out of opening-covering position causing the second panel to move into and out of opening-covering position simultaneously with the first panel.

2. The invention of claim 1 in which the second panel is a rubber curtain having a looped form between its ends and wherein a biasing member is associated with said loop in such a manner that it acts to urge said curtain into opening-covering position.

3. The invention of claim 1 in which the first panel is a rubber-covered metal mesh curtain slide.

4. A blasting apparatus having a work-tumbling conveyor, a blasting projector positioned to direct blastant particles at the work tumbled by the conveyor, a housing enclosing the conveyor and projector, a work loading and unloading opening in the housing adjacent the conveyor, a slidable panel connected to slide down over the inside of the housing to cover the opening, a pliable curtain having one end secured above and interiorly of the opening, the other end of the curtain being secured to the slidable panel to move down and cover the opening along with the panel and the intermediate portion of the curtain being loosely suspended between said ends, and a rollable weight restring on the intermediate portion of the curtain to cause the descending curtain to hang very close to the conveyor and present a blastant-baffling surface spaced inwardly from the panel.

5. The combination of claim 4 in which the panel is a wire mesh fabric covered on its inner face with rubber and is rolled up on a roller above the opening, the lower edge of the opening is devoid of panel stops, the curtain is rubber with blastant-passing perforations in the portion hanging lowest, and the weight is a roll having spaced peripheral ribs.

6. The combination of claim 4 in which the conveyor has a perforated rubber outer surface.

7. The combination of claim 4 in which the conveyor is essentially a series of metal slats linked together.

8. The combination of claim 5 in which the roller is connected for actuation to raise and lower the panel, and a frictionally held ratchet mechanism is included in the connection to apply frictional resistance only to the lowering of the panel.

9. In combination with a blasting machine for blasting work pieces as they tumble on a conveyor loop, a conveyor construction comprising a pair of spaced, parallel chains fitted about spaced sprockets, a set of slats supported between said chains, each slat being provided with arms extending from opposite ends thereof, said arms forming the connection between said slats and said chains, each of said arms being offset from the plane of its respective slat and arranged in overlying relationship to its respective chain, said chains being positioned in substantially the same lateral plane as said slats.

10. The combination of claim 9 in which the linear portions of the respective slats are closely adjacent each other and have intermeshing serrations.

11. The combination of claim 4 in which a deflector gate is positioned within the housing at the lower portion of the opening and the gate is counterbalanced to tilt up within the housing during the work tumbling and to automatically tilt down into externally projecting position when a work piece is dropped on it from the conveyor.

12. In a blasting machine for blasting work pieces as they tumble on a conveyor loop, a conveyor of perforated rubber construction fitted in endless fashion about an arcuately disposed set of rollers, and guide discs rotatably mounted with their edges engaging a portion of the conveyor in the recess of the arcuate arrangement to hold this portion in looped work-receiving configuration, the discs being rotatably mounted about axes that are tilted with respect to the rotational axes of said rollers so as to toe out at the central section of the shaped portion of the conveyor, about ⅛ to ⅜ inch beyond the opposite portions of the respective discs.

13. The combination of claim 12 in which there are three-conveyor-holding rollers, two at approximately opposing portions of the discs to support one run of the conveyor in a generally U-shaped work-receiving trough with the U tilted about 45 degrees from the vertical, said U-shaped trough being formed by said discs and wherein the third roller is positioned to hold the other run of the conveyor away from the first run, and adjustment mechanism connected to the third roller to maintain the desired tension in the conveyor, said mechanism being connected to move the third roller in a direction parallel to the path of the conveyor flight as it moves from the higher of the first two rollers to the third roller.

14. The machine of claim 9 wherein each of said slats is in overlapping relationship to the slats adjacent thereto.

References Cited in the file of this patent

UNITED STATES PATENTS

| Number | Name | Date |
|---|---|---|
| 525,526 | Anderson | Sept. 4, 1894 |
| 687,870 | Watkinson | Dec. 3, 1901 |
| 1,833,301 | Peik | Nov. 24, 1931 |
| 1,882,443 | Peik | Oct. 11, 1932 |
| 2,281,022 | Cavanaugh | Apr. 28, 1942 |
| 2,330,670 | Black | Sept. 28, 1943 |
| 2,336,660 | West | Dec. 14, 1943 |
| 2,349,368 | Myers | May 23, 1944 |
| 2,533,265 | Keefer | Dec. 12, 1950 |
| 2,563,084 | Turnbull | Aug. 7, 1951 |
| 2,628,705 | Kline | Feb. 17, 1953 |